(12) United States Patent
Videt et al.

(10) Patent No.: US 9,036,370 B2
(45) Date of Patent: May 19, 2015

(54) AC/DC POWER CONVERTER WITH IMPROVED POWER FACTOR AND IMPROVED THDI

(75) Inventors: Arnaud Videt, Villeneuve d'Ascq (FR); Hocine Boulharts, Triel sur Seine (FR); Heu Vang, Carrieres sous Poissy (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 13/996,299

(22) PCT Filed: Dec. 12, 2011

(86) PCT No.: PCT/EP2011/072445
§ 371 (c)(1),
(2), (4) Date: Jun. 20, 2013

(87) PCT Pub. No.: WO2012/084572
PCT Pub. Date: Jun. 28, 2012

(65) Prior Publication Data
US 2013/0286689 A1   Oct. 31, 2013

(30) Foreign Application Priority Data

Dec. 20, 2010 (FR) ...................................... 10 60845

(51) Int. Cl.
| | | |
|---|---|---|
| H02M 3/24 | (2006.01) | |
| H02M 7/06 | (2006.01) | |
| H02M 1/12 | (2006.01) | |
| H02M 1/42 | (2007.01) | |

(52) U.S. Cl.
CPC ........ *H02M 3/24* (2013.01); *H02M 1/12* (2013.01); *H02M 1/4216* (2013.01); *Y02B 70/126* (2013.01); *H02M 7/06* (2013.01)

(58) Field of Classification Search
None
See application file for complete search history.

(56) References Cited

U.S. PATENT DOCUMENTS

| | | | | |
|---|---|---|---|---|
| 5,345,375 A | * | 9/1994 | Mohan ............................ | 363/40 |
| 5,784,269 A |   | 7/1998 | Jacobs et al. | |
| 5,936,855 A | * | 8/1999 | Salmon ........................... | 363/46 |
| 5,969,957 A | * | 10/1999 | Divan et al. .................... | 363/36 |
| 5,982,645 A | * | 11/1999 | Levran et al. ................... | 363/37 |
| 6,031,739 A | * | 2/2000 | He et al. .......................... | 363/44 |
| 6,043,705 A | * | 3/2000 | Jiang ............................ | 327/589 |
| 6,046,915 A | * | 4/2000 | Jacobs et al. ................... | 363/39 |

(Continued)

OTHER PUBLICATIONS

Salmon, J. et al., "Improving the Operation of 3-phase Diode Rectifiers using an Asymmetrical Half-Bridge DC-Link Active Filter," Industry Applications Conference, 2000. Conference Record of the 2000 IEEE, vol. 4, pp. 2115 to 2122, (Oct. 8, 2000) XP010522550.

(Continued)

*Primary Examiner* — Timothy J Dole
*Assistant Examiner* — Monica Mata
(74) *Attorney, Agent, or Firm* — Oblon, McClelland, Maier & Neustadt, L.L.P.

(57) ABSTRACT

A power converter including: a first controlled current source configured to control current flowing on a DC supply bus of the converter, a switch connected to a second current source and to a third current source and to each of input phases of the converter, a first controller configured to control the first current source to impose a current on the DC supply bus, and a second controller synchronized with the first controller and configured to control the second current source and the third current source to impose a current on one of the input phases selected with aid of the switch.

7 Claims, 3 Drawing Sheets

(56) References Cited

Figure 1:
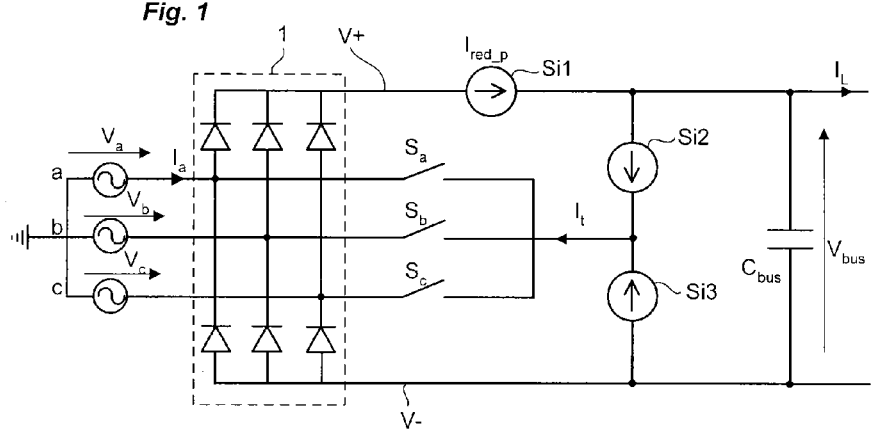

U.S. PATENT DOCUMENTS 8,416,594 B2     4/2013     Videt et al.
2012/0113691 A1    5/2012     Videt et al.

OTHER PUBLICATIONS

Hyunjae, Y. et al., "A New Circuit Design and Control to Reduce Input Harmonic Current for a Three-phase AC Machine Drive System having a very Small DC-link Capacitor," Applied Power Electronics Conference and Exposition (APEC), 2010 Twenty-Fifth Annual IEEE, pp. 611 to 618, (Feb. 21, 2010), XP031649808.

Ertl,H. et al., "A Constant Output Current Three-Phase Diode Bridge Rectifier Employing a Novel "Electronic Smoothing Inductor"," IEEE Transactions on Industrial Electronics, IEEE Service Center, vol. 52, No. 2, pp. 454 to 461, (Apr. 1, 2005), XP011129546.

Yash Veer Singh, et al., "Three-phase Electric Drive with Modified Electronic Smoothing Inductor," Energy Conversion Congress and Exposition (ECCE), 2010 IEEE, pp. 4199 to 4203, (Sep. 12, 2010) XP031786956.

C. Klumper et al., "Evaluation of the Converter Topologies suited for Integrated Motor Drives," 2003 IEEE pp. 890 to 897, (2003) XP055013702.

International Search Report Issued Oct. 4, 2012 in PCT/EP11/072445 Filed Dec. 12, 2011.

\* cited by examiner

AC/DC POWER CONVERTER WITH IMPROVED POWER FACTOR AND IMPROVED THDI

The present invention pertains to a power converter of AC/DC type designed to improve the rate of harmonic distortion (THDi) of the current tapped off from the electrical network and the power factor.

In a known manner, a power converter comprises several input phases connected to the network, for example three input phases if it is connected to a three-phase network. Connected to its input phases, a power converter comprises a rectifier module making it possible to transform the AC voltage provided by the network into a DC voltage. The converter also comprises a DC power supply bus equipped with a first power supply line at positive potential and with a second power supply line at negative potential, to which lines the DC voltage is applied, and a bus capacitor connected between the first power supply line and the second power supply line and intended to maintain the DC voltage on the bus constant.

When the rectifier module is connected between an AC network and a capacitive load, such as for example the DC power supply bus of a variable speed drive, an input current tapped off from the network is formed of spikes corresponding to the recharging of the bus capacitor as soon as the voltage between input phases becomes greater than the voltage of the power supply bus. Whether the rectifier module is single-phase or three-phase, the input current tapped off from the network is therefore far from being sinusoidal since, in addition to its fundamental, it contains numerous harmonics.

The harmonics of the input current are characterized by two known indicators dubbed THDi ("Total Harmonic Distortion of Current") and PWHD ("Partial Weighted Harmonic Distortion"). The THDi corresponds to the rate of harmonic distortion in terms of current which represents the effective value of the harmonics, relative to the effective value of the fundamental current. The PWHD introduces for its part a weighting giving more weight to the high-frequency harmonics, more particularly those of ranks 14 to 40.

A known solution for reducing the THDi is to perform a filtering on the DC bus by the addition of a DC inductor, which, if its value is large enough, ensures continuous conduction, that is to say the rectifier current flowing on the bus, at the output of the rectifier, never falls back to zero. The larger the value of the inductor employed, the less undulation in the rectifier current. If the value of the DC inductor tends to infinity, the rectifier current becomes constant and the voltage of the DC bus no longer undulates since it is stabilized at the mean value of the rectifier voltage. To obtain as constant as possible a rectifier current, the value of the inductor will therefore have to be very high, and this will give rise to cost and bulkiness problems.

Moreover, a circuit making it possible to reduce the THDi at the input of the power converter by the addition of two controlled current sources connected between the first power supply line and the second power supply line is known from the publication entitled "*A new circuit design and control to reduce input harmonic current for a three-phase AC machine drive system having a very small DC-link capacitor*"—Authors: Hyunjae YOO, Seung-Ki Sul—Reference: IEEE 978-1-4244-4783-1/10, pages 611-618. The two current sources are for example formed by a switching leg comprising two switches and an inductor connected on the one hand to the midpoint situated between the two switches and on the other hand to each of the input phases via switching means, said switching means making it possible to steer the current generated by each current source toward one or the other of the input phases.

The aim of the invention is to propose a power converter making it possible to obtain a reduced THDi (<5%) and a power factor approaching 1, with a view to minimizing the number of components employed and to optimizing the dimensioning and the cost of the transformer present at input.

This aim is achieved by a power converter comprising:
  several input phases connected to a power supply network delivering a current on each input phase,
  a rectifier module connected to the input phases,
  a DC power supply bus connected to the rectifier module and comprising a first power supply line and a second power supply line,
  a bus capacitor connected to the first power supply line and to the second power supply line,
  a first controlled current source formed by a controlled electronic inductor intended for controlling the current flowing on the DC power supply bus and,
  a second controlled current source and a third controlled current source connected between the first power supply line and the second power supply line, upstream of the bus capacitor,
  switching means connected on the one hand to the second controlled current source and to the third controlled current source and on the other hand to each of the input phases, said switching means being controlled so as to steer the current generated by the second controlled current source or by the third controlled current source onto one of the input phases,
  first control means designed to control the first controlled current source so as to impose a current on the DC power supply bus and second control means, synchronized with the first control means and designed to control the second current source and the third current source so as to impose a current on one of the input phases, selected with the aid of the switching means.

According to a particular feature of the invention, the controlled electronic inductor comprises an inductor and a variable voltage source.

According to another particular feature, the variable voltage source comprises an electronic converter comprising a first switching leg, a second switching leg and a capacitor connected in parallel, each switching leg comprising at least one electronic switch.

According to another particular feature, the second controlled current source and the third controlled current source comprise an assembly formed of at least one switching leg connected between the first power supply line and the second power supply line and of an inductor connected to the midpoint of the switching leg and to the switching means. The switching leg comprises for example two switches connected in series, the midpoint being situated between the two switches.

According to another particular feature, the switching means comprise several switches each connected to an input phase and intended to steer the current generated by the second controlled current source and the third controlled current source.

The invention relates to a variable speed drive comprising an inverter stage furnished with switching legs which are intended to convert a DC voltage into a variable voltage intended to supply an electrical load, this variable speed drive comprising a power converter such as defined hereinabove connected upstream of its inverter stage.

Figure 2:
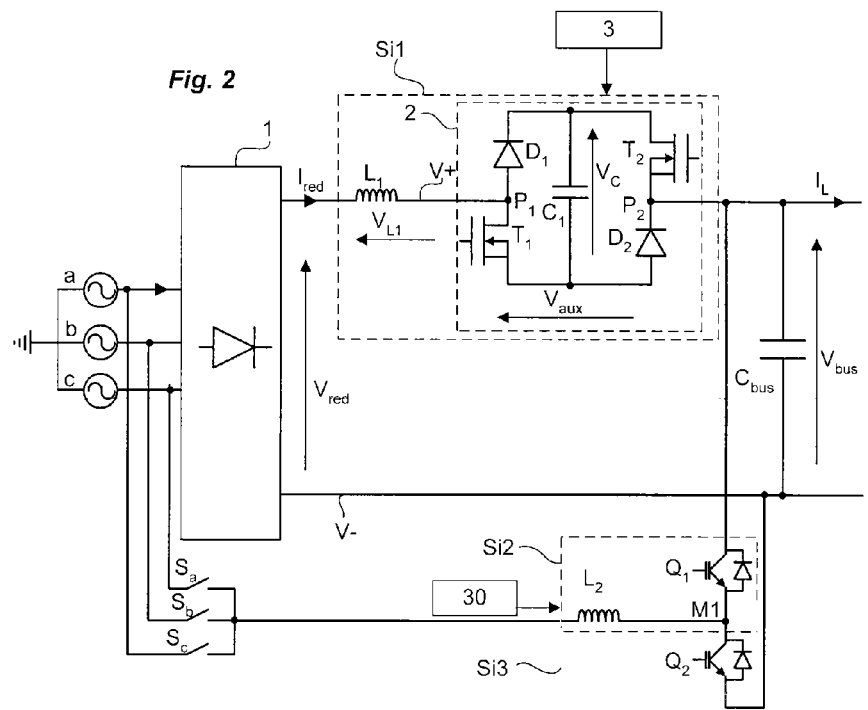
Figure 3:
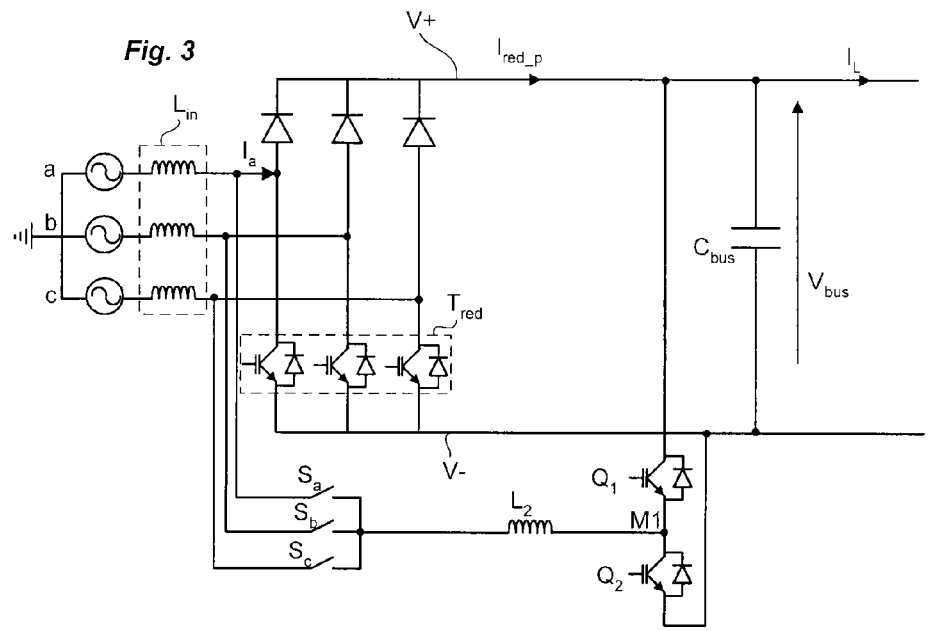
Figure 4:
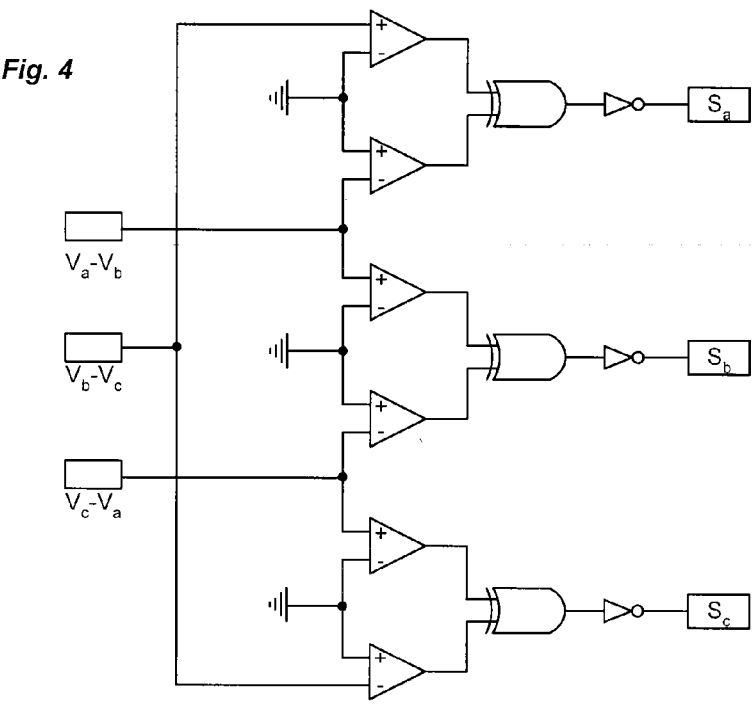

Other characteristics and advantages will become apparent in the detailed description which follows while referring to an embodiment given by way of example and represented by the appended drawings in which:

FIG. 1 illustrates the operating principle of the power converter of the invention, FIG. 2 represents in a schematic manner a preferred embodiment of the power converter according to the invention, FIG. 3 represents in a schematic manner another embodiment of the power converter according to the invention, FIG. 4 represents the control algorithm for the switching means employed in the power converter of the invention to steer the current onto one of the input phases, FIGS. 5A to 5D show curves representing the simple voltages of the input phases and the currents generated by each controlled current source.

With reference to FIG. 1, in a known manner, a power converter of AC/DC type comprises a rectifier module 1 and a DC power supply bus connected to the rectifier module 1. The rectifier module 1 is connected to the network on two or three input phases a, b, c (three phases in FIG. 1). In this FIG. 1, the rectifier module 1 is for example a diode bridge which makes it possible to rectify an AC voltage provided by the network and to apply a rectified voltage to the DC power supply bus. More precisely, the rectifier module 1 comprises several legs each composed of two diodes in series, each leg being connected to an input phase a, b, c by the midpoint situated between the two diodes.

The DC power supply bus is connected downstream of the rectifier module 1. It comprises a first power supply line V+ at positive potential and a second power supply line V− at negative potential. At least one bus capacitor $C_{bus}$ is connected to each of the two power supply lines of the bus and makes it possible to maintain the voltage of the bus at a constant value.

This power converter can for example be included in a variable speed drive comprising an inverter module (not represented) connected to its DC power supply bus and equipped with several controlled switching legs making it possible to chop the DC voltage and to obtain a variable voltage intended to supply an electrical load.

According to the invention, the power converter employs a first controlled current source Si1 intended for controlling the current flowing on the DC power supply bus at the output of the rectifier module 1, this current $I_{red\_p}$ being designated hereinafter the rectifier current.

This first controlled current source Si1 can have different configurations and different locations in the power converter.

According to a first preferred embodiment represented in FIG. 2, the first current source Si1 takes the form of a controlled electronic inductor. It is then connected in series with the first power supply line V+ or the second power supply line V− and comprises:

a DC inductor (L) of low value, a controlled variable voltage source taking the form of an electronic converter 2 composed of two distinct switching legs in parallel and of a capacitor $C_1$ connected in parallel with the two switching legs.

According to another embodiment not represented, the first controlled current source Si1 described hereinabove can be replaced with a well known converter of "boost" type connected in series with the first power supply line V+ or the second power supply line V− of the power converter.

According to another embodiment represented in FIG. 3, the first controlled current source Si1 can take the form of a triple "boost" rectifier. It is then composed of the input inductors $L_{in}$ connected to the input phases a, b, c and of an active switching stage ($T_{red}$) produced on the rectifier module 1. The bottom or top diodes of the rectifier module are then replaced with bidirectional electronic switches for example of IGBT type.

In the subsequent description, we are more particularly interested in the preferred embodiment in which the first controlled current source Si1 takes the form of a controlled electronic inductor such as represented in FIG. 2. One chooses for example to place this controlled electronic inductor on the first power supply line V+ of the bus. The rectifier current $I_{red\_p}$ generated will then be positive. Of course, it is possible to choose to position this electronic inductor on the second power supply line V−. In this case, the rectifier current ($I_{red\_n}$ not represented) generated will then be negative.

According to this embodiment, the switching legs of the electronic converter 2 each comprise for example an electronic switch T1, T2 connected in series with a diode D1, D2. Each switching leg comprises a connection midpoint P1, P2 situated between its electronic switch T1, T2 and its diode D1, D2. The connection midpoint P1 of the first switching leg is connected to the inductor $L_1$ and the connection midpoint P2 of the second switching leg is connected to the bus capacitor $C_{bus}$. On a switching leg of the electronic converter 2, the series arrangement of the electronic switch and of the diode is shifted with respect to that of the other switching leg.

The electronic switches T1, T2 employed in the electronic converter 2 are for example transistors of MOSFET type controlled by suitable control means 3, employing for example PWM (Pulse width modulation) control. Other components able to fulfill the same function can of course be employed. The PWM control of the two switches consists in comparing two sawtooth-shaped signals which are synchronized and in phase opposition with a constant control signal (commonly called the modulating single) with a view to deducing the instants and durations of switching of each of the switches of the electronic converter. Control of the electronic switches T1, T2 makes it possible to obtain a voltage value $V_{aux}$ across the terminals of the electronic converter 2 lying in the interval [$-V_C, V_C$].

The electronic converter 2 thus behaves as a controlled variable voltage source making it possible to modulate the voltage $V_C$ across the terminals of the capacitor C1 of the electronic converter 2 and thus to obtain the voltage $V_{aux}$ across the terminals of this electronic converter 2.

The following relation is thus obtained between the voltage $V_{bus}$ of the DC power supply bus, the voltage $V_L$ across the terminals of the inductor $L_1$, the voltage $V_{aux}$ across the terminals of the controlled electronic converter 2 and the voltage $V_{red}$ of the rectifier module 1:

$$V_{L1} = V_{red} - V_{bus} - V_{aux} \qquad (1)$$

By controlling the voltage $V_{aux}$ across the terminals of the electronic converter 2, it is thus possible to vary the voltage $V_{L1}$ and thus to control the rectifier current $I_{red\_p}$ and to impose a particular profile thereon.

According to the invention, in addition to the first current source Si1 formed by the electronic inductor described hereinabove, the power converter of the invention comprises two other current sources Si2, Si3 controlled in an identical manner, that is to say with the same setpoint at input, by control means 30. With reference to FIG. 1, the second current source Si2 and the third current source Si3 are connected in series between the first power supply line and the second power supply line, upstream of the bus capacitor $C_{bus}$ and downstream with respect to the rectifier module 1. The power converter also comprises switching means connected on one side to the midpoint M1 situated between the second current source Si2 and the third current source Si3 and to each of the input phases a, b, c of the converter.

With reference to FIG. 2, these two current sources Si2, Si3 are for example formed by an assembly comprising at least one switching leg equipped with at least two electronic switches $Q_1$, $Q_2$ and with a common inductor $L_2$ connected to the midpoint situated between the two switches $Q_1$, $Q_2$. The switching means are connected to the inductor $L_2$ and to each of the input phases a, b, c of the converter. These switching means are employed to steer the current generated by the second current source Si2 and the third current source Si3 toward one of the three input phases a, b, c. Accordingly the switching means comprise three bidirectional switches $S_a$, $S_b$, $S_c$ connected in parallel, each of these switches $S_a$, $S_b$, $S_c$ connecting the inductor $L_2$ to a distinct input phase a, b, c. According to the invention, the two current sources Si2, Si3 are controlled in an identical manner by actuating the switches Q1, Q2. These two current sources Si2, Si3 are controlled so as to impose the current $I_t$ on an input phase a, b, c selected by virtue of the switching means.

The operating principle of the invention is to shape the rectifier current $I_{red\_p}$ with the aid of the first current source Si1 and to shape the current $I_t$ with the aid of the second current source Si2 and of the third current source Si3 with a view to obtaining input currents $i_a$, $i_b$, $i_c$ of sinusoidal form (THDi<5%). Accordingly, the means of control 3, 30 of the three current sources Si1, Si2, Si3 employed are mutually synchronized in such a way that $I_{red\_up}$ obtained by virtue of the first current source Si1 corresponds to the maximum values of the input currents $i_a$, $i_b$, $i_c$ and that the current $I_t$ obtained by virtue of the second and the third current source Si2, Si3 corresponds to the harmonic component of order 3 (at 150 Hz if the frequency of the network is 50 Hz) of the input currents $i_a$, $i_b$, $i_c$. By imposing these two currents $I_{red\_p}$, $I_t$, the minimum values of the input currents $i_a$, $i_b$, $i_c$ are obtained automatically.

In a known manner, the input currents to be obtained must follow the following relations:

$$i_a(t) = \frac{P_{out}}{U \cdot \sqrt{3}} \cdot \sqrt{2} \cdot \sin(\omega t)$$

$$i_b(t) = \frac{P_{out}}{U \cdot \sqrt{3}} \cdot \sqrt{2} \cdot \sin\left(\omega t + \frac{2\pi}{3}\right)$$

$$i_c(t) = \frac{P_{out}}{U \cdot \sqrt{3}} \cdot \sqrt{2} \cdot \sin\left(\omega t - \frac{2\pi}{3}\right)$$

In which U represents the effective voltage between phases of the electrical network and $P_{out}$ corresponds to the output power delivered at the output of the converter.

The shape of the current $I_{red\_p}$ generated by the first current source Si1 and the shape of the current $I_t$ generated by the second and the third current source Si2, Si3 must therefore be as follows:

$$I_{red\_p}(t) = \max(i_a(t), i_b(t), i_c(t))$$

$$I_t(t) = -[\max(i_a(t), i_b(t), i_c(t)) + \min(i_a(t), i_b(t), i_c(t))]$$

The simple input voltages $V_a$, $V_b$, $V_c$ are expressed by the following relations:

$$v_a(t) = \hat{V} \sin(\omega \cdot t)$$

$$v_b(t) = \hat{V} \sin(\omega \cdot t - 2\pi/3)$$

$$v_c(t) = \hat{V} \sin(\omega \cdot t + 2\pi/3)$$

In which $\hat{V}$ corresponds to the peak voltage provided by the network.

The shaping of the currents $I_{red\_p}$ and $I_t$ are synchronized with respect to the measured values of the simple input voltages $V_a$, $V_b$, $V_c$.

The shape of the current $I_{red\_p}$ is thus expressed by the following relation:

$$I_{red\_p}(t) = \frac{\max(v_a(t), v_b(t), v_c(t))}{\hat{V}} \cdot I_L$$

The shape of the current $I_t$ is defined by the following relation:

$$It(t) = -\frac{\min(v_a(t), v_b(t), v_c(t)) + \max(v_a(t), v_b(t), v_c(t))}{\hat{V}} \cdot I_L$$

$I_L$ corresponds to the load current provided to the electrical load connected downstream of the power converter.

FIG. 4 shows the control algorithm for the switching means employed to steer the current $I_t$ toward an input phase a, b, c of the network. According to this control algorithm, one of the switches $S_a$, $S_b$, $S_c$ of the switching means is actuated according to the state of the simple input voltages $V_a$, $V_b$, $V_c$.

This algorithm can be represented in the following manner:
The switch $S_a$ is actuated if:
$V_a<V_b$ and $V_a>V_c$ or
$V_a<V_c$ and $V_a>V_b$
The switch $S_b$ is actuated if:
$V_b<V_a$ and $V_b>V_c$ or
$V_b<V_c$ and $V_b>V_a$
The switch $S_c$ is actuated if:
$V_c<V_a$ and $V_c>V_b$ or
$V_c<V_b$ and $V_c>V_a$ Only one single switch $S_a$, $S_b$, $S_c$, at a time is made to close, the others remaining open. When one of the switches is closed, the current $I_t$ generated by virtue of the second current source Si2 and of the third current source Si3 is steered toward the corresponding input phase a, b, c and is imposed on this input phase a, b, c.

The curves represented in FIGS. 5A to 5D illustrate the operating principle of the invention.

Figures 5A, 5B, 5C, 5D:
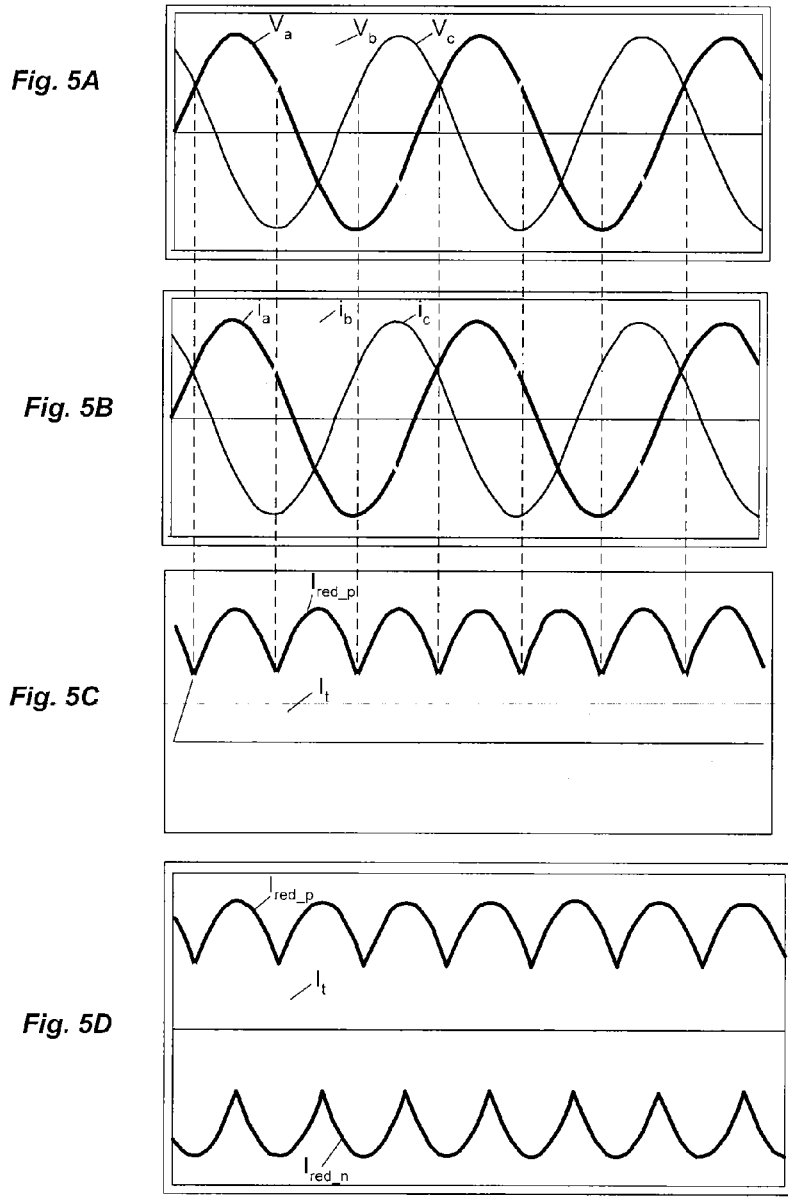

FIG. 5A shows the simple input voltages $V_a$, $V_b$, $V_c$. FIG. 5B shows the curves of input currents $i_a$, $i_b$, $i_c$ that it is desired to obtain. FIG. 5C shows the shape of the current $I_{red\_p}$ imposed by the first current source Si1 and the shape of the current $I_t$ imposed by the second current source Si2 and the third current source Si3. It can be seen in this FIG. 5C that the current $I_{red\_p}$ is formed through the control of the first current source Si1 so as to make it follow the maximum values of the currents $i_a$, $i_b$, $i_c$ and that the current $I_t$ is formed through the control of the second current source Si2 and of the third current source Si3 so as to make it follow the component of order 3 of the input currents $i_a$, $i_b$, $i_c$. By imposing the two currents $I_{red\_p}$ and $I_t$, the minimum values of the input currents $i_a$, $i_b$, $i_c$ are obtained automatically as represented in FIG. 5D (would correspond to $I_{red\_n}$ if the first current source Si1 was positioned on the second power supply line V− of the DC power supply bus).

It is of course possible, without departing from the scope of the invention, to contemplate other variants and refinements of detail and likewise to envisage the employing of equivalent means.

The invention claimed is:

1. A power converter comprising:
   plural input phases connected to a power supply network delivering a current on each input phase;
   a rectifier module connected to the input phases;
   a DC power supply bus connected to the rectifier module and comprising a first power supply line and a second power supply line;
   a bus capacitor connected to the first power supply line and to the second power supply line;
   a first controlled current source formed by a controlled electronic inductor configured to control current flowing on the DC power supply bus;
   a second controlled current source and a third controlled current source connected between the first power supply line and the second power supply line, upstream of the bus capacitor, wherein the first controlled current source is disposed upstream of a point on the first power supply line at which the second controlles current source is directly connected to the first power supply line;
   switching means connected to the second controlled current source and to the third controlled current source and to each of the input phases, the switching means being controlled so as to steer the current generated by the second controlled current source or by the third controlled current source onto one of the input phases; and
   first control means configured to control the first controlled current source so as to impose a current on the DC power supply bus and second control means, synchronized with the first control means and configured to control the second current source and the third current source so as to impose a current on one of the input phases, selected with aid of the switching means.

2. The power converter as claimed in claim 1, wherein the controlled electronic inductor comprises an inductor and a variable voltage source.

3. The power converter as claimed in claim 2, wherein the variable voltage source comprises an electronic converter comprising a first switching leg, a second switching leg, and a capacitor connected in parallel, each switching leg comprising at least one electronic switch.

4. The power converter as claimed in claim 1, wherein the second controlled current source and the third controlled current source comprise an assembly formed of at least one switching leg connected between the first power supply line and the second power supply line and of an inductor connected to the midpoint of the switching leg and to the switching means.

5. The power converter as claimed in claim 4, wherein the switching leg comprises two switches connected in series, the midpoint being situated between the two switches.

6. The power converter as claimed in claim 4, wherein the switching means comprises plural switches each connected to an input phase and configured to steer the current generated by the second controlled current source and the third controlled current source.

7. A variable speed drive comprising:
   an inverter stage including switching legs configured to convert a DC voltage into a variable voltage configured to supply an electrical load; and
   a power converter such as defined in claim 1, connected upstream of the inverter stage.

* * * * *